(12) United States Patent
Tracht

(10) Patent No.: US 9,174,601 B2
(45) Date of Patent: Nov. 3, 2015

(54) VEHICLE SEAT ASSEMBLY WITH AIR BAG GUIDE SECURED TO AN AIR BAG

(71) Applicant: LEAR CORPORATION, Southfield, MI (US)

(72) Inventor: Michael L. Tracht, Ingolstadt (DE)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 14/060,348

(22) Filed: Oct. 22, 2013

(65) Prior Publication Data

US 2014/0117648 A1 May 1, 2014

(30) Foreign Application Priority Data

Oct. 31, 2012 (DE) .......................... 10 2012 219 967

(51) Int. Cl.
*B60R 21/207* (2006.01)
*B60R 21/16* (2006.01)

(52) U.S. Cl.
CPC ......... *B60R 21/207* (2013.01); *B60R 2021/161* (2013.01); *B60R 2021/2076* (2013.01); *Y10T 29/49826* (2015.01)

(58) Field of Classification Search
CPC ............... B60R 21/201; B60R 21/207; B60R 2021/2076; B60R 2021/161; Y10T 29/49826
USPC ................................ 280/728.2, 730.1, 730.2
See application file for complete search history.

(56) References Cited

U.S. PATENT DOCUMENTS

| | | | | | |
|---|---|---|---|---|---|
| 5,667,242 | A | * | 9/1997 | Slack et al. ................. | 280/730.2 |
| 5,890,734 | A | * | 4/1999 | Saderholm ................. | 280/730.2 |
| 5,893,579 | A | * | 4/1999 | Kimura et al. ............. | 280/730.2 |
| 5,897,134 | A | * | 4/1999 | Stein et al. ................. | 280/728.3 |
| 6,045,151 | A | | 4/2000 | Wu | |
| 6,457,741 | B2 | * | 10/2002 | Seki et al. ................... | 280/730.2 |
| 6,612,610 | B1 | * | 9/2003 | Aoki et al. ................. | 280/730.2 |
| 7,311,325 | B2 | | 12/2007 | Tracht et al. | |
| 7,357,412 | B2 | | 4/2008 | Tracht et al. | |
| 7,594,678 | B2 | | 9/2009 | Schedler | |
| 7,712,772 | B2 | * | 5/2010 | Muller ....................... | 280/730.2 |
| 7,731,226 | B2 | | 6/2010 | Zink | |

(Continued)

FOREIGN PATENT DOCUMENTS

| | | |
|---|---|---|
| CN | 102145679 | 8/2011 |
| DE | 102005057443 A1 | 6/2006 |

(Continued)

OTHER PUBLICATIONS

German Search Report Dated May 31, 2013, Application No. 10 2012 219 967.5, Applicant Lear Corporation, 11 Pages.

(Continued)

*Primary Examiner* — Paul N Dickson
*Assistant Examiner* — Timothy Wilhelm
(74) *Attorney, Agent, or Firm* — Brooks Kushman P.C.

(57) ABSTRACT

In at least certain embodiments, the vehicle seat assembly comprises a frame, a seat pad, a trim cover extending over the seat pad with the cover having a release seam, and an air bag assembly including an inflator and an air bag. In accordance with this embodiment, the air bag assembly includes an air bag guide associating the air bag assembly with the release seam, with one of the air bag guide and the air bag having rear ends connected to opposite sides of the other of the air bag guide and the air bag.

9 Claims, 4 Drawing Sheets

(56) References Cited

U.S. PATENT DOCUMENTS

| | | | |
|---|---|---|---|
| 7,874,578 B2* | 1/2011 | Thomas et al. | 280/728.3 |
| 8,123,246 B2* | 2/2012 | Gilbert et al. | 280/728.2 |
| 8,439,394 B2 | 5/2013 | Tracht | |
| 8,672,352 B2* | 3/2014 | Tracht et al. | 280/743.2 |
| 2006/0113752 A1 | 6/2006 | Tracht | |
| 2006/0113763 A1 | 6/2006 | Tracht et al. | |
| 2007/0164545 A1* | 7/2007 | Muller | 280/730.2 |
| 2007/0267856 A1 | 11/2007 | Schedler | |
| 2008/0296941 A1* | 12/2008 | Bederka et al. | 297/216.1 |
| 2010/0244414 A1* | 9/2010 | Gilbert et al. | 280/730.1 |
| 2011/0193327 A1 | 8/2011 | Tracht et al. | |
| 2012/0175924 A1 | 7/2012 | Festag et al. | |

FOREIGN PATENT DOCUMENTS

| | | |
|---|---|---|
| DE | 102010001772 A1 | 8/2011 |
| DE | 102011002561 A1 | 7/2012 |
| WO | 0006426 A1 | 2/2000 |
| WO | 2012105957 | 8/2012 |

OTHER PUBLICATIONS

Chinese Office Action for Chinese Application No. 201310520324.3, Completed by the Chinese Patent Office on Aug. 3, 2015, 7 Pages.

* cited by examiner

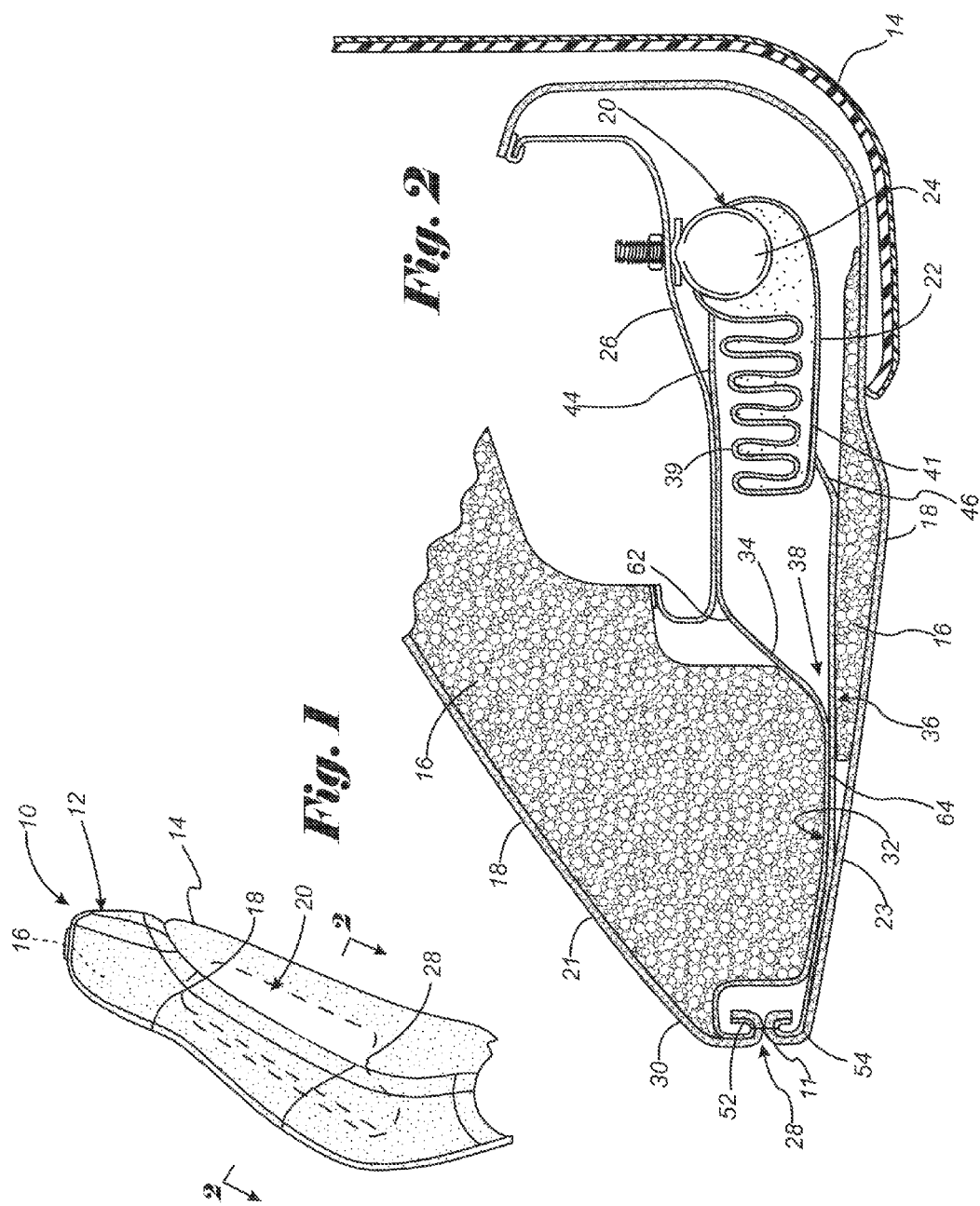

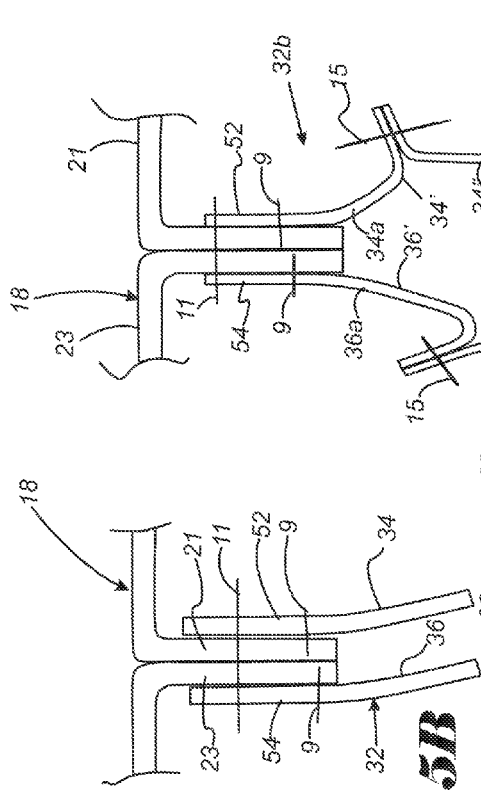
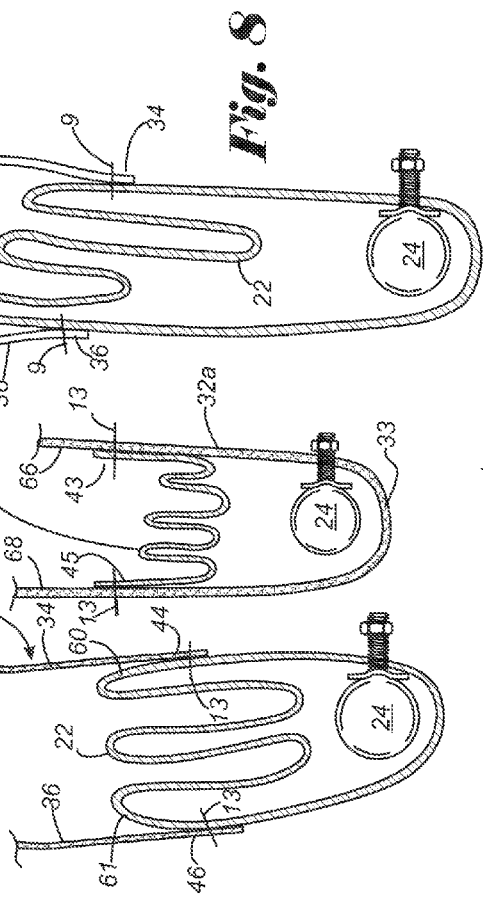
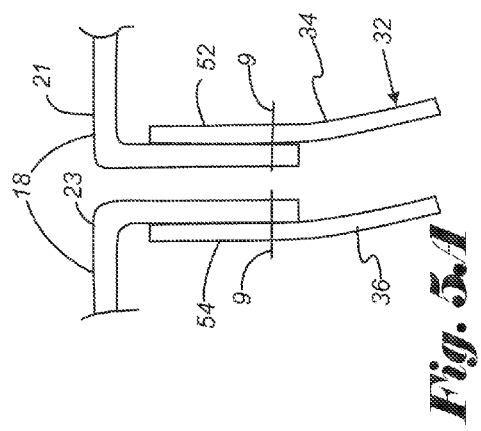
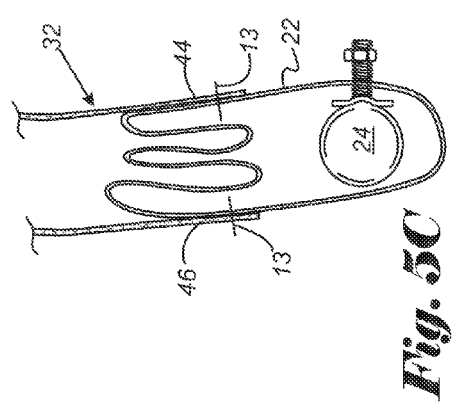

VEHICLE SEAT ASSEMBLY WITH AIR BAG GUIDE SECURED TO AN AIR BAG

CROSS-REFERENCE TO RELATED APPLICATIONS

This application claims foreign priority benefits under 35 U.S.C. §119(a)-(d) to DE 10 2012 219 967.5, filed Oct. 31, 2012, the disclosure of which is hereby incorporated by reference in its entirety.

TECHNICAL FIELD

The present disclosure relates to a vehicle seat assembly, and in particular, to a seat assembly including an air bag having an air bag guide secured to the air bag.

BACKGROUND

Vehicles can be equipped with side air bags, which may be in the form of an air bag disposed within a vehicle seat assembly. One limitation of air bags that are located within a seat assembly, is that the air bag needs to break through the seating material before it can fully deploy to protect a vehicle occupant. During deployment, such an air bag may encounter foam, or other seat pad materials, and must then break through a seat trim cover in order to escape from the seat assembly. Another limitation is that the air bag should break through the cover material at a predetermined location to optimize effectiveness. Other limitations are that the incorporation of the air bag in the seat assembly should not cause discomfort or safety issues to occupants.

Prior vehicle seat assemblies equipped with side air bags and manufacturing methods are disclosed in U.S. Pat. Nos. 6,045,151 and 7,357,412, for example.

SUMMARY

A vehicle seat assembly is provided. In at least one embodiment, the vehicle seat assembly comprises a frame, a seat pad adjacent the frame and having a main body portion for supporting an occupant, a trim cover extending over at least a part of the seat pad and having a release seam adjacent the seat pad, and an air bag assembly mounted on the frame within the trim cover in a spaced relationship from the release seam. In accordance with this embodiment, the air bag assembly includes an inflator and a folded air bag that is inflatable by the inflator to unfold and project outwardly from the seat assembly through the air bag release seam of the trim cover. Further in accordance with this embodiment, the air bag assembly includes an air bag guide associating the air bag assembly with the release seam, with the air bag guide comprising two panels made of a flexible material, each panel having a first end secured to the release seam and a second end secured to the air bag.

In another embodiment, the vehicle seat assembly comprises a frame, a seat pad adjacent the frame, a trim cover extending over at least a part of the seat pad, an air bag assembly mounted on the frame, the air bag assembly including an inflator and a folded air bag that is inflatable by the inflator to unfold and project outwardly from the seat assembly, and an air bag guide associating the air bag assembly with the release seam, with one of the air bag guide and the air bag having rear ends connected to opposite sides of the other of the air bag guide and the air bag.

In another aspect, a method of making a vehicle seat assembly is provided. In this embodiment, the method comprises providing a frame, mounting a seat pad on the frame, disposing a trim cover having a release seam over at least a portion of the seat pad and the frame, securing an air bag assembly adjacent the frame, the air bag assembly including an air bag that is inflatable, and providing an air bag guide and associating the air bag guide with the air bag assembly, with the air bag assembly and the air bag guide being secured to each other.

While exemplary embodiments in accordance with the disclosure are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 1 is a fragmentary side view of a portion of a seat assembly in accordance with an embodiment of the present disclosure;

FIG. 2 is a fragmentary cross-sectional view of a portion of a seat assembly shown in FIG. 1 taken along FIG. 2-2;

FIGS. 5A-5C schematically illustrate an exemplary assembly process;

FIG. 6 is an enlarged view of components shown in FIG. 2;

FIG. 7 is a view similar to FIG. 6 showing another embodiment;

FIG. 8 is a view similar to FIG. 6 showing yet another embodiment; and

DETAILED DESCRIPTION

Figure 3:
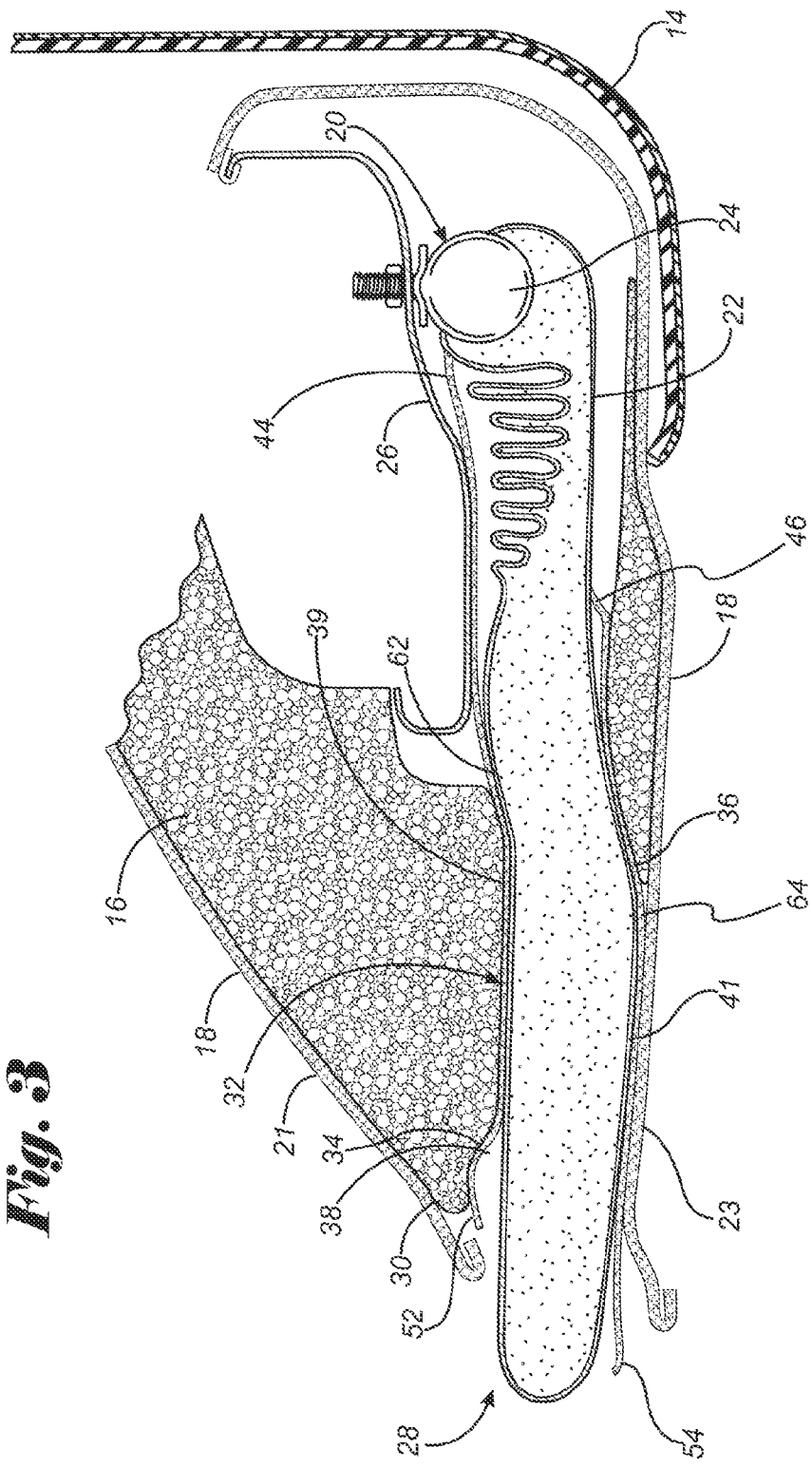
FIG. 3 is a view similar to FIG. 2 showing the air bag inflated.

As required, detailed embodiments of the present disclosure are disclosed herein. However, it is to be understood that the disclosed embodiments are merely exemplary of the disclosure that may be embodied in various alternative forms. The figures are not necessarily of scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present disclosure.

Moreover, except where otherwise expressly indicated, all numerical quantities in this description and in the claims indicating amounts of materials or conditions of reactions and/or use are to be understood as modified by the word "about" in describing the broader scope of this disclosure. Practice within the numerical limits stated is generally preferred. Also, unless expressly stated to the contrary, the description of a group or class of materials as suitable preferred for a given purpose in connection with the disclosure implies that mixtures of any two or more members of the group or class may be equally suitable or preferred.

The present disclosure describes various vehicle seat configurations that include an inflatable air bag assembly. Several specific embodiments are set forth in the following description and in the Figures to provide a thorough understanding of certain embodiments according to the present disclosure. As those of ordinary skill in the art will understand, one or more features of an embodiment illustrated and described with reference to any one of the Figures may be combined with features illustrated in one or more other Figures to produce embodiments that are not explicitly illustrated or described. In addition, other embodiments may be practiced without one or more of the specific features explained in the following description.

FIG. 1 shows a portion of an exemplary seat assembly 10 in accordance with the present disclosure. The illustrated seat assembly 10 includes a seat back 12, and seat pad 16 covered by a trim cover 18. As is well known, the seat assembly 16 includes a seat bottom (not shown). The trim cover 18 may be made of any suitable material such as cloth, vinyl or leather, etc. As is shown in FIG. 1, in at least some embodiments, a relatively rigid plastic molding 14 can optionally be provided in the rear area of the seat assembly 10 to provide support and/or for aesthetics.

In at least one embodiment, the seat pad 16 is made from a molded polymeric material, such as a polyurethane foam as is shown in FIG. 2. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

As shown in FIG. 2, the air bag assembly 20 includes an air bag 22 and an inflator 24, which is configured to supply inflation fluid such as gas to the air bag 22, thereby facilitating deployment of the air bag 22. In at least the illustrated embodiment, the air bag assembly 20 also includes an optional soft cover which at least partially surrounds the air bag 22 and the inflator 24. The optional soft cover can be made of any suitable sheet material such as a woven or non-woven cloth material.

Also shown in FIG. 2 is a portion of a seat frame 26 which can be used for mounting the seat assembly 10 to a vehicle. The seat pad 16 may be directly attached to the frame 26 at various points. The seat frame 26 can be made of any suitable material, such as metal, plastic, rigid foam, or a composite such as carbon fiber disposed in a resin matrix.

In at least the illustrated embodiment, the trim cover 18 includes a first or front panel 21 and a second or side panel 23 that cooperate to form an air bag release seam 28 which in at least one embodiment is adjacent to a side 30 of the seat pad 16. It should be understood that the location of the release seam 28 can vary as desired. In at least one embodiment, the release seam 28 is 40 to 70 cm in length, but can be any suitable length.

Referring again to FIG. 2, in the illustrated embodiment, the air bag assembly 20 is located within the trim cover 18 and is mounted on the frame 26 adjacent the air bag release seam 28 in a spaced relationship from the release seam. The schematically illustrated folded air bag 22, upon deployment, is inflated by inflation fluid from the inflator 24 to unfold and project outwardly from the seat 10 through the air bag release seam 28 of the trim cover 18 (FIG. 3).

With continuing reference to FIG. 2, an air bag guide of the seat back component is generally indicated by 32 is associated with the air bag assembly 20. The air bag guide 32 and the air bag 22 are secured to each other. In at least one embodiment, the air bag guide 32 comprises an inner panel 34 and an outer panel 36. The air bag guide 32 is made of any suitable sheet material effective to protect the seat pad 16 during deployment of the air bag 22. For example, a woven or non-woven cloth material, which may include natural or synthetic materials such as nylon. One material that is found to be effective is a polyester material, of the type from which the air bag 22 may be manufactured. The sheet material may be flexible or elastic. Regardless of the type of material used to make the air bag guide 32, the use of the air bag guide 32 can be helpful in reducing friction on the air bag 22 as it deploys. Although a polymer such as nylon may be particularly beneficial, even a fleece material will help reduce the friction on the air bag 22. This is because the air bag guide 32 inhibits contact between the deploying air bag 22 and the seat pad 16 and helps to prevent small particles from separating from the seat pad and being introduced into the vehicle compartment.

Figure 4:
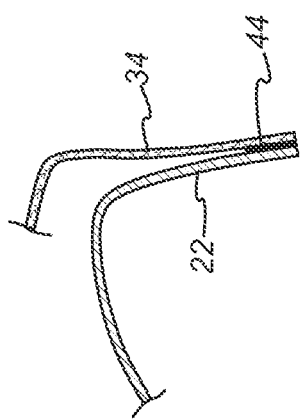
FIG. 4 is an enlarged view of components of the seat assembly shown in FIG. 2.

In at least one embodiment, the inner and outer panels 34, 36 of the air bag guide 32 respectively have rear ends 44, 46 that attach to the air bag 22 to effectively associate the air bag guide 32 with the air bag assembly 20. The ends 44, 46 may be secured to the air bag 22 in any suitable manner, such as by ultrasonic welding, stitching, adhesive, Velcro, retainers and J-clips. FIG. 4 schematically illustrates rear end 44 ultrasonically welded to the air bag 22. In certain embodiments where the air bag 22 is covered by a soft cover, the soft cover forms part of the air bag unit and, rather than being attached directly to the air bag 22, the rear ends 44, 46 can be attached to the soft cover, which is made of a similar material as the air bag guide 32.

In the illustrated embodiments, the inner and outer panels 34, 36 of the air bag guide 32 respectively include front ends 52, 54 attached to the trim cover 18 adjacent the release seam 28. Each panel 34, 36 respectively includes an intermediate portion 62, 64 that extend between and connect ends 44, 52 and 46, 54, respectively.

As illustrated in FIG. 2, the front ends 52, 54 of the panels 34, 36 are secured to opposite sides of the release seam 28, however it is contemplated that the ends 52, 54 could be secured on the same side of the release seam, i.e., on the same trim cover panel.

In the illustrated embodiments, the front ends 52, 54 are adjacent each other and face in the same direction, however it should be understood that the ends could also be attached to the trim cover such that they are adjacent each other and face in opposite directions. The front ends 52, 54 of the inner and outer panels 34, 36 can be attached to the trim cover 18 adjacent the release seam 28 by any suitable manner, such as via stitching, ultrasonic welding, adhesive, Velcro, retainers, J-clips, etc.

For example, as illustrated in FIG. 5A-5C, stitching 9 can be used to connect the front ends 52 and 54 of the panels 34 and 36 to the panels 21 and 23 of the trim cover 18. The stitching 9 can be applied in any suitable manner. Stitching 11 can then be used to connect the front ends 52, 54, and thus panels 34, 36, and the trim panels 21, 23 together. Stitches 13 can then be used to secure the rear ends 44, 46 of the panels 34, 36 to opposite sides of the air bag 22. While stitching 9, 11 and 13 have been shown and described it should be understood that other pairs of securement could be used, such as ultrasonic welding, adhesive, Velcro, retainers, J-clips, etc.

In at least one embodiment, the air bag guide 32 is effective to inhibit contact between the deploying air bag 22 and the seat pad 16. This can help to prevent energy loss from the air bag 22 by decreasing friction and protecting the seat pad 16 from damage. This, in turn, can also help to reduce the deployment time for the air bag 22 and/or the amount of inflation fluid required to deploy the air bag.

In at least one embodiment, the inner and outer panels 34 and 36 of the air bag guide 32 form a deployment channel 38 for the air bag 22. As best shown in FIGS. 2-3, the deployment channel 38 is oriented to facilitate deployment of the air bag 22 through the seam 28 in the trim cover 18. The panels 34 and 36, and in particular the front ends 52, 54, aid in tearing the release seam 28 by directing the deployment force of the air bag 22 to the release seam 28. In certain embodiments, the trim cover 18 can be made of a material that is more stretchable than the panels 34, 36.

Upon deployment of the air bag assembly 20, as shown schematically in FIG. 3, the deploying air bag 22 causes relative movement of the flexible inner and outer panels 34 and 36 away from each other which then provide a guiding function of the unfolding air bag 22 as it moves between the panels toward the air bag release seam 28 and eventually tears open the release seam for outward projection of the air bag to provide the occupant protection. Furthermore, as the air bag 22 deploys through the deployment channel 38, the air bag guide 32 acts as a blocking member that forms a barrier on two sides 39, 41 of the air bag 22, thereby inhibiting contact between the air bag 22 and the seat pad 16. Thus, the seat pad 16 is moved away from the air bag 22 as it deploys through the deployment channel 38.

As best shown in FIG. 3, the attachment of the front ends 52, 54 to the seam 28 helps to facilitate deployment of the air bag 22 through the seam 28. This is because the deployment channel 38 opens as the air bag 22 is deployed, and this causes the deploying air bag 22 to exert an outward force on the panels 34, 36 at the seam 28; this creates force at the location of the front ends 52, 54 on the seam 28 which helps to open the seam 28 to provide an easy exit for the air bag 22. Also attachment of the panels 34, 36 to the release seam 28 helps to ensure that the air bag 22 will deploy in the predetermined desired manner through the seam 28. Because the panels 34, 36 are connected to each other with the same connection or stitching, as the case may be, as the trim panels 21 and 23 are connected to each other, relatively consistent deployment of air bag in seat assemblies 10 employing the air bag guide 32.

In the embodiment shown in FIG. 6, the air bag guide 32 has two separate panels 34, 36 having rear ends 44, 46 secured to opposite intermediate portions 60, 61 of the air bag 22. In this embodiment, the air bag 22 wraps around the inflator 24.

Referring to FIG. 7, another embodiment of an air bag guide 32a is illustrated. This embodiment is similar in construction, manufacture, and operation to the embodiment shown in FIG. 6. In the embodiment shown in FIG. 7, the air bag guide 32a is generally similar to the air bag guide 32 shown in FIG. 6, except that it is made of a unitary panel 33 that wraps around the inflator 24. In this embodiment, the air bag 22a has two ends 43, 45 that attach to opposed intermediate portions 66, 68 of the air bag guide 32a. Thus, the air bag 22a is generally similar to air bag 22 shown in FIG. 6 except that it has two ends 43, 45.

Referring to FIG. 8, another embodiment of an air bag guide 32b is illustrated. This embodiment is similar in construction, manufacture, and operation to the embodiment shown in FIG. 6. In this embodiment, the air bag guide 32b generally comprises two panels 34a, 36a. However, panels 34a and 36a each comprise two panel segments 34', 34", and 36', 36", respectively. In this embodiment the panel segments 34', 34", and 36', 36" are secured to each other in any suitable manner, such as by stitching 15.

Figure 9:
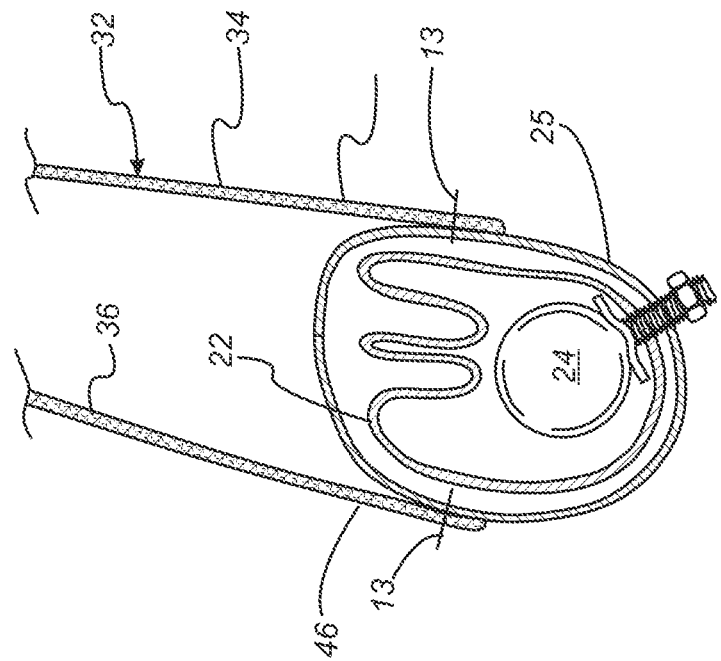
FIG. 9 is a view similar to FIG. 6 showing still yet another embodiment.

Referring to FIG. 9, another embodiment is illustrated. This embodiment is similar in construction, manufacture, and operation to the embodiment shown in FIG. 6. In this embodiment, the air bag guide 32 has its two ends 43, 45 attached to opposite ends of soft cover 25. In at least one embodiment, the soft cover 25 has a tensile strength that is at least equal to, and in other embodiments greater than the tensile strength of the air bag guide 32.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. A vehicle seat assembly comprising:
a frame;
a seat pad adjacent the frame, the seat pad having a main body portion for supporting an occupant;
a trim cover extending over at least a part of the seat pad, the trim cover having a release seam adjacent the seat pad;
an air bag assembly mounted on the frame within the trim cover in a spaced relationship from the release seam, the air bag assembly including an inflator and a folded air bag that is inflatable by the inflator to unfold and project outwardly from the seat assembly through the release seam of the trim cover; and
an air bag guide associating the air bag assembly with the release seam, the air bag guide comprising two panels made of a flexible material, each of the panels having a first end secured to the release seam and a second end, opposite the first end, secured to the air bag, wherein each of the panels has an intermediate portion extending between and connecting the first and second ends of the panel, with the second ends being spaced from each other, wherein the second ends of the panels are secured to opposite sides of the air bag, and wherein the trim cover comprises a front trim panel and a side trim panel connected to each other to form the release seam, the second ends of the two panels of the air bag guide being separate, and spaced, from each other such that the air bag guide does not have a portion extending between and connecting the second ends of the panels.

2. The vehicle seat assembly of claim 1, wherein the first ends of the panels are secured to the same side of the release seam.

3. The vehicle seat assembly of claim 1, wherein the first ends of the panels are secured to opposite ends of the release seam.

4. A vehicle seat assembly comprising:
a frame;
a seat pad adjacent the frame;
a trim cover extending over at least a part of the seat pad, the trim cover having a release seam adjacent the seat pad;
an air bag assembly mounted on the frame, the air bag assembly including an inflator and a folded air bag that is inflatable by the inflator to unfold and project outwardly from the seat assembly; and
an air bag guide associating the air bag assembly with the release seam, one of the air bag guide and the air bag having rear ends connected to opposite sides of the other of the air bag guide and the air bag, wherein the air bag comprises a sheet material that wraps around the inflator and has opposed intermediate portions, and the air bag guide has the rear ends that connect to the intermediate portions of the air bag.

5. The vehicle seat assembly of claim 4, wherein the air bag guide comprises a first panel having one of the rear ends, a first end connected to the release seam, and an intermediate portion extending between and connecting the rear and first ends of the first panel, and a second panel having a second of the rear ends, a first end connected to the release seam, and an intermediate portion extending between and connecting the rear and first ends of the second panel.

6. The vehicle seat assembly of claim 5, wherein each of the first and second panels comprise two panel members connected to each other.

7. The vehicle seat assembly of claim 4, wherein the air bag guide has front ends that connect to the release seam.

8. The vehicle seat assembly of claim 4, wherein the air bag comprises a folded air bag wrapped in a soft cover, wherein the air bag guide has rear ends and the rear ends are connected to opposite sides of the soft cover.

9. The vehicle seat assembly of claim 4, wherein the trim cover comprises a front trim panel and a side trim panel connected to each other to form the release seam, the air bag guide having front ends connected to opposite sides of the release seam, the rear ends being connected to opposite sides of the air bag.

* * * * *